H. P. & D. G. CONN.
TWO-CYCLE EXPLOSION ENGINE.
APPLICATION FILED SEPT. 27, 1916.
1,273,826.
Patented July 30, 1918.
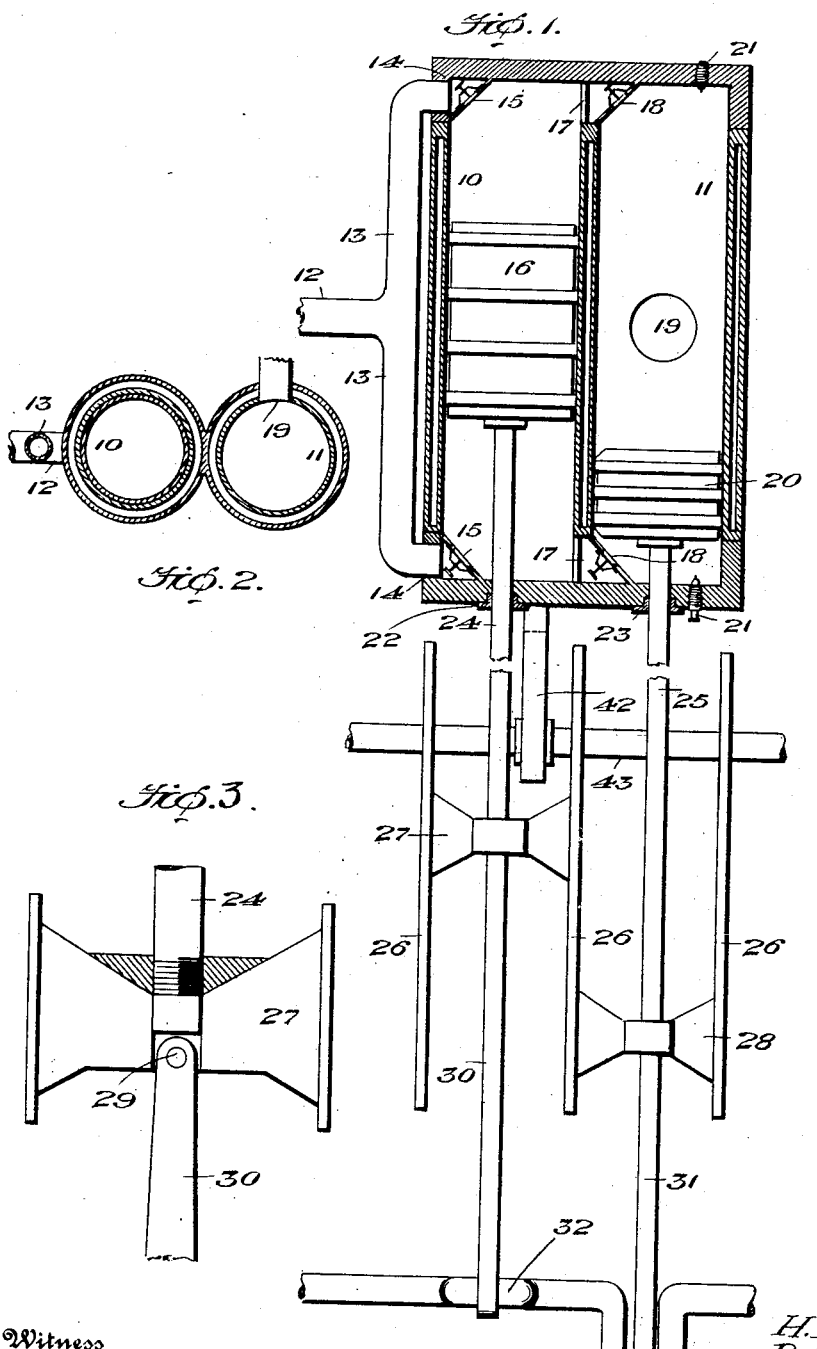

UNITED STATES PATENT OFFICE.

HENRY P. CONN AND DAVID G. CONN, OF ROSEBURG, OREGON.

TWO-CYCLE EXPLOSION-ENGINE.

1,273,826. Specification of Letters Patent. Patented July 30, 1918.

Application filed September 27, 1916. Serial No. 122,490.

*To all whom it may concern:*

Be it known that we, HENRY P. CONN and DAVID G. CONN, citizens of the United States, residing at Roseburg, in the county of Douglas and State of Oregon, have invented certain useful Improvements in Two-Cycle Explosion-Engines, of which the following is a specification, reference being had therein to the accompanying drawing.

This invention relates to improvements in double acting two-cycle explosive engines, one object of the invention being the provision of an engine in which the power piston compresses a charge and receives an explosive impulse at the end of each stroke.

A further object of this invention is the provision of an engine of this type which is simple in construction, and which by reason of the few parts, will be cheap to manufacture and to operate, therefore producing a thoroughly efficient and practical engine.

In the accompanying drawings:—

Figure 1 is a vertical sectional view through one unit of the present invention, the crank shaft and cross-heads being shown and parts being broken away to disclose the guides and adjacent parts.

Fig. 2 is a cross section taken through the intake manifold and cylinders of the engine, and Fig. 3 is an enlarged detail view of the cross-head connection.

Referring to the drawings, the numeral 10 designates the feed cylinder and 11 the power cylinder, both of which constitute a unit and are preferably cast *en bloc*.

The intake manifold 12 which is supplied by any form of carbureter or gas mixer, has the two branches 13 which extend in opposite directions and are connected in the intake ports 14 of the feed cylinder 10, there being disposed adjacent each port a valve 15 which opens when the feed piston 16 is moving there away from and closes when such piston is moving toward such valve.

Leading from opposite ends of the feed cylinder 10 are ports 17 which are in communication through the check valve 18 with the respective ends of the power cylinder 11 which is provided with the centrally disposed exhaust port 19.

Mounted in the power cylinder 11 is the power piston 20, while connected in the respective heads of the cylinder 11 are the spark plugs 21, so that there is an explosion at the end of each stroke of the piston 20 to propel the same in opposite directions.

Mounted in the lower end of each of the respective cylinders 10 and 11 are stuffing boxes 22 and 23, through which slide the piston rods 24 and 25 of the respective feed and power pistons 16 and 20.

The supporting structure for the cylinders is not here shown, the cross-head guides 26 being supported thereby so that the respective cross-heads 27 and 28 may be guided therein and thus properly connect the respective piston rods 24 and 25 through the flexible connection 29 to the main piston rods 30 and 31 which in turn are connected to the crank shaft 32. In order that the piston 16 should be midway of its stroke when piston 20 is at the end of its stroke it is necessary that the cranks be shown spaced 90° as illustrated in Fig. 1.

It will thus be seen that as the power piston is operated upwardly explosively, the crank shaft 32 will impart reciprocation to the feed piston 16, which as it moves downwardly, will draw in a charge through the upper check valve 15 and will compress the charge in the lower end of the cylinder and force the same through the check valve 18 at the lower end of the power cylinder, the movement in the opposite direction drawing a charge into the lower end of the cylinder 10 and forcing a charge into the upper end of the power cylinder 11. By this means an exceedingly simple two cycle engine is provided. It will be noticed that when the piston 16 is disposed midway in its own cylinder 10 that the other piston 20 is at either end of the power cylinder 11 and also that the exhaust port 19 is disposed centrally of the power cylinder. The cycle is as follows:—Suppose an explosion is taking place, the gas at the end of the power cylinder 11 moves the piston 20 to the upper end of the power cylinder 11. This assumes that the gas has already been compressed prior to ignition and that the compressed gas has come into the cylinder 11 from the cylinder 10. As the piston 20 moves upwardly it is driving the exhaust gases out from the exhaust port 19 which exhaust gases are due to the explosion which had previously occurred at the upper end of the cylinder 11. Now the piston 16 is so timed that it will move from a central to an upper position and back to a central position while the piston 20 makes a complete forward stroke and immediately when the piston shall come opposite the exhaust port 19 the piston 16 has already compressed a previous charge of combustible gas in the upper end of the cylinder 10 and also driven the same when the piston 16 reaches its uppermost position in cylinder 10, into the power cylinder 11 whence it is further compressed as the piston 20 makes its finish stroke by moving beyond the exhaust port 19 toward the upper end of the power cylinder 11. In a similar manner the two pistons act one to drive out the exhaust gases and the other to initially compress gas in the cylinder 10 and force it into the cylinder 11 where it is also compressed by the piston 20,—when an explosion takes place against the piston 20 at the upper end of the cylinder 11. Of course while the piston 16 is compressing the gas by moving forwardly against the same, a fresh supply of combustible gas is let into the cylinder 10 in back of the piston 16 ready to be compressed upon the back stroke of this piston 16.

The cylinders 10 and 11 are to be water jacketed or cooled in any desired manner. If desired, any suitable governor mechanism may be connected to the intake manifold of the engine for the purpose of controlling the flow of gas into the cylinder and governing the speed of the engine. (Not shown).

What we claim as new is:—

In a device of the class described in combination a pair of cylinders having a common dividing wall, a water jacket formed around and between said cylinders, two cap pieces secured so as to close the opposite ends of said cylinders, an intake pipe extending longitudinally of one cylinder and having rightangular ends connected to said respective caps, both cylinders at their dividing wall being formed at opposite ends with ports, a pair of diagonally-disposed valve seats formed upon each cap piece at the upper and lower corners of said respective cylinders, one pair of said valve seats being opposite the ends of said intake pipe and the other pair of said valve seats being opposite said ports, the valve seats at the lower end of said cylinders inclining in an opposite direction relatively to those at the upper end thereof, and check valves associated with said seats and adapted to open outwardly in projecting relation from said valve seats.

In testimony whereof we affix our signatures.

HENRY P. CONN.
DAVID G. CONN.

Copies of this patent may be obtained for five cents each, by addressing the "Commissioner of Patents, Washington, D. C."